(12) United States Patent
Lee et al.

(10) Patent No.: US 11,443,043 B2
(45) Date of Patent: Sep. 13, 2022

(54) AUTOMATIC VERIFICATION METHOD AND SYSTEM

(71) Applicant: PEGATRON CORPORATION, Taipei (TW)

(72) Inventors: Ming-Hung Lee, Taipei (TW); Chiu-Kuei Chen, Taipei (TW); Guo-Guang Wei, Taipei (TW); Cheng-Kuan Hoh, Taipei (TW); Ming-Te Ho, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 700 days.

(21) Appl. No.: 16/393,821

(22) Filed: Apr. 24, 2019

(65) Prior Publication Data

US 2019/0392151 A1 Dec. 26, 2019

(30) Foreign Application Priority Data

Jun. 26, 2018 (TW) .................. 107121954

(51) Int. Cl.
*G06F 21/57* (2013.01)
*G06F 9/4401* (2018.01)
*H04L 9/32* (2006.01)

(52) U.S. Cl.
CPC .......... *G06F 21/575* (2013.01); *G06F 9/4401* (2013.01); *H04L 9/3236* (2013.01)

(58) Field of Classification Search
None
See application file for complete search history.

(56) References Cited

U.S. PATENT DOCUMENTS

| 8,296,579 | B2 | 10/2012 | Piwonka et al. |
| 2010/0082960 | A1 | 4/2010 | Grobman et al. |
| 2011/0161648 | A1 | 6/2011 | Ekberg et al. |

FOREIGN PATENT DOCUMENTS

| JP | 2006323814 A | 11/2006 |
| TW | 201324225 A1 | 6/2013 |
| TW | 201516742 A | 5/2015 |
| TW | I525470 B | 3/2016 |
| TW | 201635081 A | 10/2016 |
| WO | WO-2010-113282 A1 | 10/2010 |

*Primary Examiner* — Syed A Roni
(74) *Attorney, Agent, or Firm* — Muncy, Geissler, Olds & Lowe, P.C.

(57) ABSTRACT

The application provides an automatic verification method and system, with the method executing in a startup procedure of a host electronic device and including: calculating specific to system information to obtain a set of verification values in the startup procedure when the host electronic device is booted up; comparing a verification value from the set of verification values with a preset verification value from a set of preset verification values according to a preset condition and obtaining a comparison result; decapsulating a key to substitute for a step of manually inputting a password when the comparison result indicates conformity; and decrypting the host electronic device with the key to complete the startup procedure. If the system information is desired to be changed, a proxy device is required to re-calculate according to the changed system information to obtain a new set of verification values to substitute the original preset verification values.

9 Claims, 3 Drawing Sheets

AUTOMATIC VERIFICATION METHOD AND SYSTEM

CROSS REFERENCE TO RELATED APPLICATIONS

This non-provisional application claims priority under 35 U.S.C. § 119(a) to Patent Application No. 107121954 filed in Taiwan, R.O.C. on Jun. 26, 2018, the entire contents of which are hereby incorporated by reference.

BACKGROUND

Technical Field

The application is directed to a verification method and system, and in particular to an automatic verification method and system executing in a startup procedure of a host electronic device to execute verification automatically.

Related Art

To ensure the security of an electronic device system in a security verification mechanism for an electronic device system, it is known in the prior art that disk data in the electronic device system is encrypted and a password is set. When the electronic device system is rebooted up, a user needs to manually input the password for decryption to successfully start the electronic device system. As such, a person without the password cannot start the electronic device system. Therefore, in the prior art it is at least impossible to provide the function of obtaining the password to access the system via an automatic verification method.

SUMMARY

According to an embodiment, an automatic verification method executes in a startup procedure of a host electronic device and includes: calculating specific to at least one system information to obtain a set of verification values in the startup procedure when the host electronic device is booted up; comparing at least one verification value from the set of verification values with at least one preset verification value from a set of preset verification values according to a preset condition defined in advance and obtaining a comparison result; decapsulating a key if the comparison result indicates conformity; and then decrypting the host electronic device with the key to complete the startup procedure.

After the startup procedure is completed, re-calculating according to the changed system information in a proxy device is required to obtain a new set of preset verification values before at least one system information in the host electronic device is desired to be changed; the new set of preset verification values is provided for the host electronic device to substitute the original set of preset verification values; the key is re-encapsulated with the new set of preset verification values; and the at least one system information in the host electronic device is then changed. Therefore, when the startup procedure after re-startup is entered, a system verification module would calculate to obtain a set of verification values according to the changed system information, compare the set of verification values with a new set of preset verification values to obtain a comparison result, and decapsulate a password if the comparison result indicates conformity, thereby completing the startup procedure.

According to the embodiments of the system, the system mainly includes a host electronic device executing security verification; the host electronic device is provided with a system verification module and at least one system information; the at least one system information includes at least one system element and at least one system program; and the system verification module, the at least one system element and the at least one system program are coupled to one another to execute the automatic verification method during the startup procedure.

The application discloses an automatic verification method and system, where the system performs security verification by means of preset verification values stored in the system verification module, and enables a password decrypted after verification to substitute a traditional verification mechanism which requires a user to manually input the password during startup, thereby achieving the function of accessing the system by automatic verification in the startup procedure.

To get a further understanding of the technology, method and function employed by the application to achieve an established purpose, reference is made to the following detailed description and drawings related to the application, whereby it is believed that the objects, characteristics and features of the application would be understood profoundly and specifically. However, the accompanying drawings are provided only for the purpose of reference and explanation, rather than setting limits to the application.

DETAILED DESCRIPTION OF THE EMBODIMENTS

Figure 1:
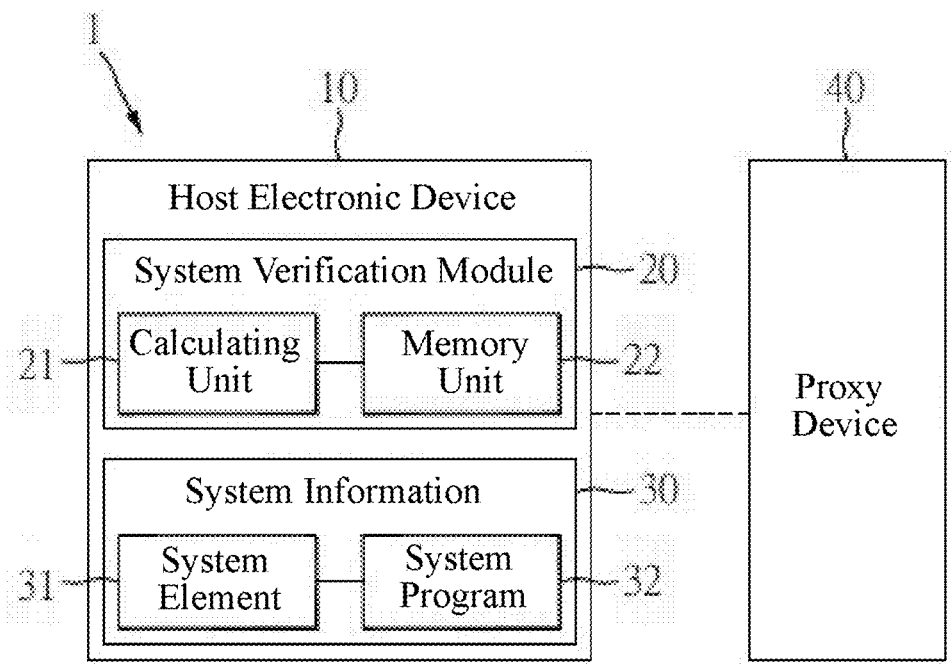
FIG. 1 shows a schematic view of a system applying an automatic verification method.

FIG. 1 shows a schematic view of an embodiment of a system applying an automatic verification method. In this embodiment, a system 1 includes a host electronic device 10, which includes a system verification module 20 and at least one system information 30. The system verification module 20 is for example a trusted platform module (TPM), to which the application is not limited. The at least one system information 30 includes at least one system element 31 and at least one system program 32, and the system verification module 20, the at least one system element and the system program are coupled to one another, with the system element 31 including at least one of a basic input output system (BIOS), a boot loader and a firmware, and the at least one system program 32 includes at least one of an operating system and an application program.

After the host electronic device 10 is booted up, the basic input output system is booted up during a startup procedure, and during initialization, a system service manager, for example, a system management program, is also executed when the boot loader is executed, that is, this automatic verification method is to execute an automatic startup procedure in the system service manager.

When the basic input output system (BIOS) is booted up, the system verification module 20 is booted up simultaneously, and the system verification module 20 calculates (for example, with a specific encryption algorithm, which may also be a hashing algorithm) specific to at least one system information 30 to obtain a set of verification values; compares at least one verification value from the foregoing set of verification values with at least one preset verification value in a set of preset verification values prestored in the system verification module 20 and obtains a comparison result; decapsulates a key preset in the system verification module 20 for decrypting the host electronic device if the comparison result indicates conformity; and decrypts for example the system program 32 with the key to complete the startup procedure.

The system verification module 20 may be implemented as either software or hardware, and can be stored in a certain block in the system if it is a software element; or embodied as a chip on a mainboard in the electronic device, which is implemented via an application-specific integrated circuit (ASIC) and has independent data processing and storage capabilities, if it is a hardware element.

The system verification module 20 shown in FIG. 1 may be a chip having an operation processing capability and storage media, and has major functional elements including a calculating unit 21 and a memory unit 22 which stores a preset condition that may be a permutation and combination manner (for example, a permutation sequence of all or part of the verification values) for comparing at least one verification value of the set of verification values. The memory unit 22 is used for storing the preset verification values, the calculating unit 21 calculates specific to at least one system information 30 to obtain a set of verification values, then compares at least one verification value from the foregoing set of verification values with the at least one preset verification value from the set of preset verification values prestored in the memory unit 22 according to a prestored preset condition and obtains a comparison result, thereby verifying whether the disk, BIOS, operating system, firmware, application program and others in the host electronic device are tampered.

Figure 2:
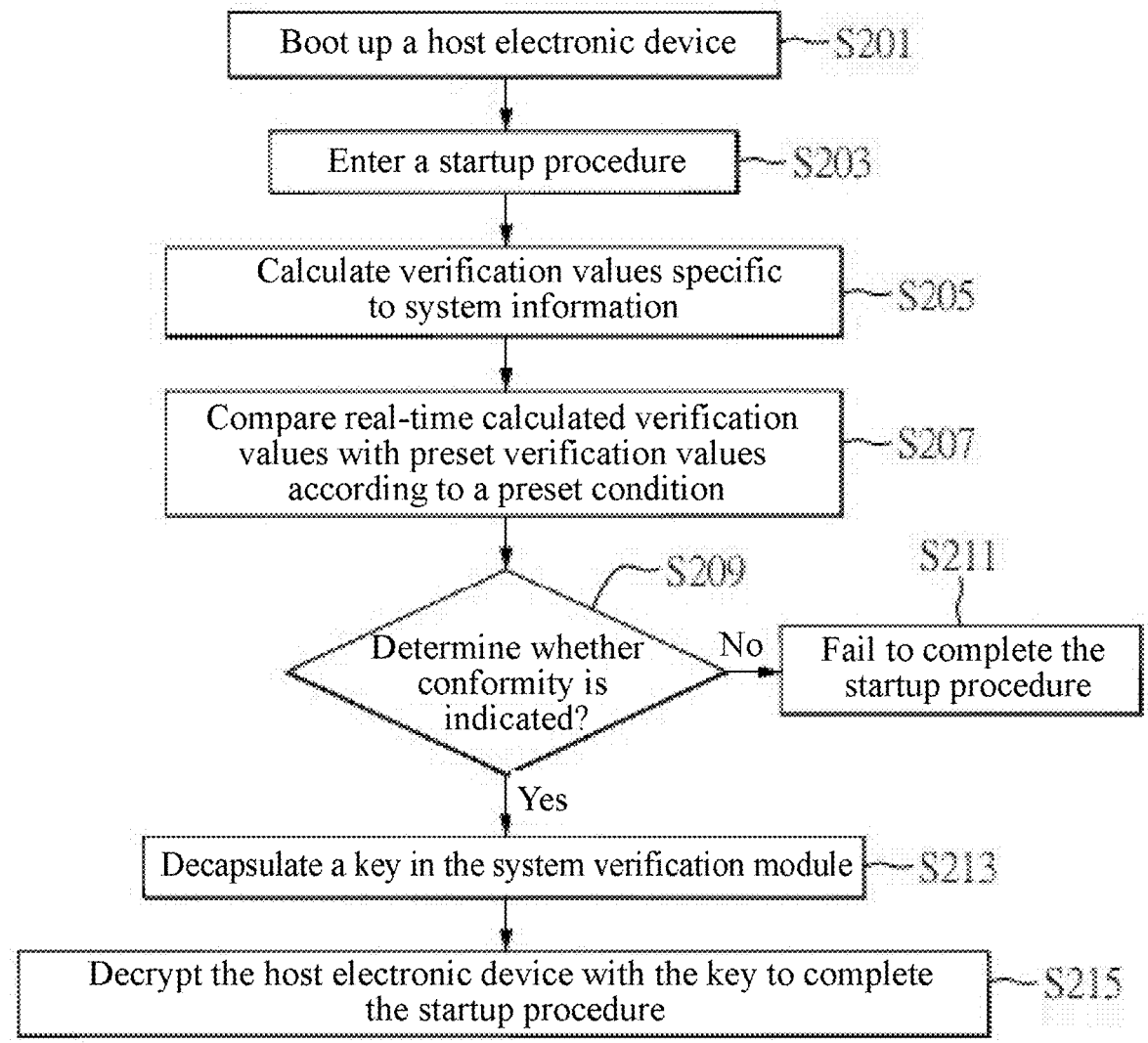
FIG. 2 shows a flow chart of the automatic verification method.

Reference can be made to FIG. 2 for the flow process of the embodiment of the automatic verification method. The automatic verification method at least includes the following steps: when a startup procedure (step S203) is entered after a host electronic device (step S201) is booted up, calculating is performed specific to at least one system information 30 to obtain a set of verification values in the startup procedure, where the set of calculated values are for example real-time calculated verification values, and in one embodiment, the system verification module 20 is driven to calculate specific to the at least one system information 30 to obtain a set of verification values, for example in step S205; the foregoing real-time calculated verification values are compared with the preset verification values by the system verification module 20 according to a preset condition (step S207) to obtain a comparison result, where in this embodiment, a set of verification values (i.e., the real-time calculated verification values) can be obtained by calculating specific to the specific system information 30 according to the calculating unit 21 and used to compare the preset verification values prestored in the memory unit 22 in the system verification module 20.

Next, whether the comparison result indicates conformity is determined (step S209). If disconformity (a negative result) is indicated, a key stored in the system verification module 20 cannot be decapsulated, and thus the startup procedure cannot be completed (step S211).

When the comparison result indicates conformity (a positive result), a key stored in the system verification module 20 is decapsulated, thereby completing the startup procedure (step S213), and the host electronic device 10 is decrypted with this key to complete the startup procedure (step S215).

With the automatic verification method provided in this embodiment, the original procedure of requiring a user to manually input a password during the startup procedure can be substituted during the startup procedure, and in terms of protection, the firmware, operating system, application program and other system information 30 can also be securely protected in addition to the basic input output system and a storage (such as a hard disk) of the electronic device system.

The system information 30 in the host electronic device 10 is constantly required to be changed by updating or upgrading, and once there is any change, automatic verification may fail under the mechanism of automatic verification described, resulting in unsuccessful startup. Therefore, when the system information 30 requiring verification, such as the basic input output system, boot loader, firmware, operating system, application program and the like undergoes deletion, addition, version updating, upgrading, or content changes, the automatic verification method provide by this embodiment further provides an automatic verification mechanism, which can re-calculate to obtain a new set of preset verification values according to the changed electronic device system, and re-encapsulate the key stored in the system verification module 20 according to the new set of verification values, so that the automatic verification procedure can be passed during next startup.

In the automatic verification method, the system 1 further includes a proxy device 40, which is coupled to the system verification module 20. When the system 1 is in a decrypted and booted-up state after the operating system is entered and the startup procedure is completed, if any system information 30 is to be changed, such as the addition/deletion, updating, upgrading, patching and substitution and the like of the system information 30, the proxy device 40 needs to re-calculate according to the changed at least one system information 30 to obtain a new set of preset verification values, send the new set of preset verification values to the system verification module 20 to substitute the original set of preset verification values, re-encapsulate the key with the new set of preset verification values, and then change the at least one system information 30 in the host electronic device 10. For the description above, reference can be made to FIG. 1 which shows a schematic view of the host electronic device 10 and the proxy device 40.

With the method of re-calculating by the proxy device 40 according to the changed at least one system information 30 to obtain a new set of preset verification values, sending the new set of preset verification values to the system verification module 20 to substitute the original set of preset verification values, and re-encapsulating the key with the new set of preset verification values, the problem that providing a corresponding new set of preset verification codes with respect to the upgrading of the system 1 is unavailable in the prior art can be solved.

Figure 3:
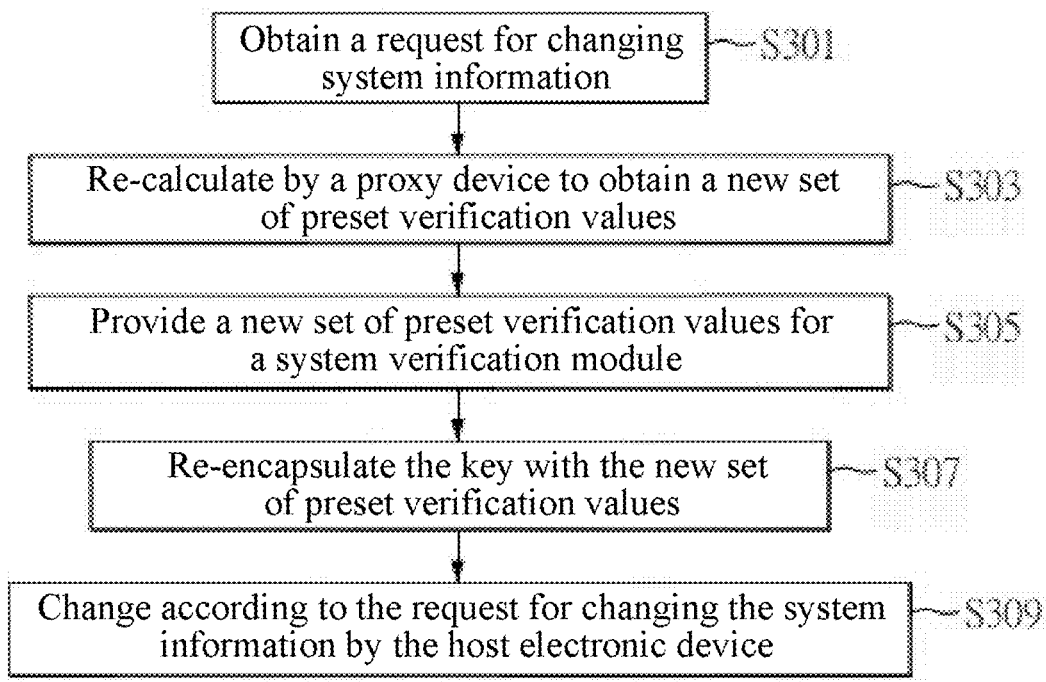
FIG. 3 shows a flow chart for changing system information.

The flow chart specific to the system information 30 to be changed is as shown in FIG. 3.

In the flow process for the system information 30 to be changed, the host electronic device 10 obtains a request for changing the system information 30 (step S301); the proxy device 40 re-calculates according to the changed system information 30 to obtain a new set of preset verification values (step S303), sends the new set of preset verification values to a memory unit 22 in the system verification module 20 (step S305) to substitute the original set of preset verification values, which is taken as the basis for security verification during next startup, and re-encapsulates the key with the new set of preset verification values (step S307); and the host electronic device 10 re-performs the process of changing at least one system information 30 in the host electronic device 10 according to the request for changing the system information 30 (step S309).

As such, when the host electronic device 10 executes the startup procedure again after the change to the system information 30 is completed, the preset verification codes stored in the system verification module 20 are new preset verification codes corresponding to verification values that are obtained by the system verification module 20 through calculating specific to the changed system information 30. Therefore, the comparison result indicates conformity even though the system information 30 of the host electronic device 10 has changed. Likewise, the key stored in the system verification module 20 can be decapsulated according to the embodiment of the flow process of the automatic verification method described in FIG. 2, and the host electronic device 10 can be decrypted with the key to complete the startup procedure.

Above all, the embodiments above illustrate the operation of the automatic verification method and system, and this method not only provides a verification method of performing calculation specific to at least one system information to obtain a set of verification values for verification, but also substitutes the traditional verification process flow requiring password input. Furthermore, this automatic verification mechanism can still be applied to various systems undergoing updating, upgrading and patching.

The description above only provides preferred feasible embodiments of the application. Any variations and modifications made within the claims of the application shall be deemed as within the scope of the application.

What is claimed is:

1. An automatic verification method executing in a startup procedure of a host electronic device, comprising:
    calculating specific to at least one system information to obtain a set of verification values in the startup procedure when the host electronic device is booted up;
    comparing at least one verification value from the set of verification values with at least one preset verification value from an original set of preset verification values according to a preset condition and obtaining a comparison result, wherein the comparison result indicates whether the at least one verification value is in conformity with the at least one preset verification value or not;
    decapsulating a key if the comparison result indicates that the at least one verification value is in conformity with the at least one preset verification value;
    decrypting the host electronic device with the key to complete the startup procedure;
    after completing the startup procedure, re-calculating according to a changed at least one system information in a proxy device to obtain a new set of preset verification values before the at least one system information in the host electronic device is desired to be changed;
    providing the new set of preset verification values for the host electronic device to substitute the original set of preset verification values;
    re-encapsulating the key with the new set of preset verification values; and
    changing the at least one system information in the host electronic device.

2. The automatic verification method according to claim 1, wherein a system verification module in the host electronic device calculates specific to the at least one system information to obtain the set of verification values and stores the set of preset verification values.

3. The automatic verification method according to claim 2, wherein the preset condition is a permutation and combination manner of at least one verification value in the set of verification values.

4. The automatic verification method according to claim 1, wherein the system information comprises at least one system element which comprises at least one of a basic input output system, a boot loader and a firmware.

5. The automatic verification method according to claim 1, wherein the system information comprises at least one system program, the at least one system program comprises at least one of an operating system and an application program executed by the host electronic device.

6. A system, comprising:
    a host electronic device, comprising a system verification module and at least one system information, wherein the at least one system information comprises at least one system element and at least one system program, the system verification module, the at least one system element and the at least one system program are coupled to one another, the system verification module internally stores an original set of preset verification values, and an automatic verification method is executed when the host electronic device is booted up, comprising:
    calculating by the system verification module specific to at least one system information to obtain a set of verification values in a startup procedure;
    comparing at least one verification value from the set of verification values with at least one verification value from the set of preset verification values according to a preset condition and obtaining a comparison result by the system verification module, wherein the comparison result indicates whether the at least one verification value is in conformity with the at least one preset verification value or not;
    decapsulating a key stored in the system verification module if the comparison result indicates that the at least one verification value is in conformity with the at least one preset verification value; and
    decrypting the host electronic device with the key to complete the startup procedure; and
    a proxy device coupled to the system verification module, wherein after completing the startup procedure, re-calculation is performed according to a changed at least one system information in the proxy device to obtain a new set of preset verification values before the at least one system information in the host electronic device is desired to be changed; the new set of preset verification values are provided for the system verification module to substitute the original set of preset verification values; the key is re-encapsulated with the new set of preset verification values; and the at least one system information in the host electronic device is changed.

7. The system according to claim 6, wherein the system information comprises at least one system element, the at least one system element comprises at least one of a basic input output system, a boot loader and a firmware.

8. The system according to claim 6, wherein the system information comprises at least one system program, the at least one system program comprises at least one of an operating system and an application program.

9. The system according to claim 6, wherein the preset condition is a permutation and combination manner of at least one verification value in the set of verification values.

* * * * *